US008826352B2

(12) United States Patent
Poltorak

(10) Patent No.: US 8,826,352 B2
(45) Date of Patent: *Sep. 2, 2014

(54) APPARATUS AND METHOD FOR PROVIDING INFORMATION IN CONJUNCTION WITH MEDIA CONTENT

(75) Inventor: Alexander I. Poltorak, Monsey, NY (US)

(73) Assignee: Poltorak Media LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/470,332

(22) Filed: May 13, 2012

(65) Prior Publication Data

US 2012/0291074 A1 Nov. 15, 2012

Related U.S. Application Data

(63) Continuation of application No. 10/328,789, filed on Dec. 24, 2002, now Pat. No. 8,225,359.

(51) Int. Cl.
*H04N 7/173* (2011.01)

(52) U.S. Cl.
USPC ............... 725/100; 725/86; 725/87; 725/88; 725/89; 725/90; 725/91; 725/103; 725/114; 725/115; 725/116; 725/144; 725/151

(58) Field of Classification Search
USPC ............ 725/86–91, 100, 103, 114–116, 144, 725/151
See application file for complete search history.

(56) References Cited

U.S. PATENT DOCUMENTS

| | | | |
|---|---|---|---|
| 6,505,160 B1 * | 1/2003 | Levy et al. .................... 704/270 |
| 7,203,952 B2 * | 4/2007 | Broadus ........................... 725/40 |
| 7,305,691 B2 * | 12/2007 | Cristofalo ....................... 725/34 |
| 2002/0010926 A1 * | 1/2002 | Lee ................................. 725/40 |
| 2002/0116471 A1 * | 8/2002 | Shteyn ........................... 709/217 |
| 2002/0184647 A1 * | 12/2002 | Komar ........................... 725/110 |
| 2003/0112354 A1 * | 6/2003 | Ortiz et al. ............... 348/333.01 |
| 2003/0154479 A1 * | 8/2003 | Brenner et al. ................ 725/40 |
| 2004/0088729 A1 * | 5/2004 | Petrovic et al. ................ 725/91 |
| 2005/0089310 A1 * | 4/2005 | Fischer ............................ 386/96 |
| 2008/0162145 A1 * | 7/2008 | Reichardt et al. ............. 704/275 |

* cited by examiner

*Primary Examiner* — Mulugeta Mengesha
(74) *Attorney, Agent, or Firm* — Anatoly S. Weiser, Esq.; Acuity Law Group, P.C.

(57) ABSTRACT

An apparatus and method for providing information in conjunction with media content, including a receiver, wherein the receiver receives at least one of a transmission of media content and a broadcast of media content, wherein the media content includes at least one of broadcast media content and entertainment media content, and further wherein the receiver receives information regarding the media content, a processor for processing at least one of the received media content and the received information regarding the media content, a display device for visually displaying the information regarding the media content, and/or a speaker device for audibly announcing the information regarding the media content.

12 Claims, 7 Drawing Sheets

APPARATUS AND METHOD FOR PROVIDING INFORMATION IN CONJUNCTION WITH MEDIA CONTENT

CROSS-REFERENCE TO RELATED APPLICATIONS

This application is a continuation of and claims priority to U.S. patent application Ser. No. 10/328,789, entitled APPARATUS AND METHOD FOR PROVIDING INFORMATION IN CONJUNCTION WITH MEDIA CONTENT, filed on Dec. 24, 2002 now U.S. Pat. No. 8,225,359, now allowed. The disclosure of the foregoing patent document is incorporated herein by reference as if fully set forth herein, including Figures, Claims, and Tables.

FIELD OF THE INVENTION

The present invention pertains to an apparatus and method for providing information in conjunction with media content and, in particular, to an apparatus and method for providing information in conjunction with broadcast media content, entertainment media content, and/or media content which can be stored on, and/or played from, a storage and/or playing medium.

BACKGROUND OF THE INVENTION

Millions of individuals listen to radio stations and/or television stations each day. Individuals utilize radios in order to listen to music, radio programs, radio news programs, and/or radio talk shows, etc. Individuals utilize television in order to watch television programs, television shows, television news programs, television talk shows, movies, and/or music videos, etc.

As many individuals can attest, oftentimes a song may be playing which the listener desires to know more about. For example, a listener can be listening to a song, find it enjoyable, and desire to know the name of the song, the performer who is performing the song, or any other information (i.e. the name of the album on which the song may be featured or found, etc.) so that he or she may purchase a copy of same. Similarly, an individual listening to a radio show or radio talk show may want to know more information regarding the show's subject matter or the show's performers or participants so that he or she may obtain a copy of same or seek to listen to the respective show at a later time.

While information regarding any of the respective songs, radio shows, and/or radio programs, can be introduced prior to, or announced subsequent to, the broadcast of the respective songs, radio shows, and/or radio programs, the information is typically not provided during the course of the broadcast and, as a result, an individual who misses the respective introduction or announcement may never receive the desired information. Particularly during broadcast of a piece of classical music, which, at times, may be quite long, a listener may struggle to recall the name of a familiar piece and the composer thereof or be curious to learn the composer, performer(s) and the name of currently playing piece of music that caught the listener's attention.

In a similar manner, there are many instances in which an individual may be watching a television show or program and, finding same to be enjoyable, desire to obtain more information about same. For example, an individual watching a television talk show may want to learn the name of the show, the subject matter or description of the show, the performers or participants involved in the show, or any other information, which can enable the individual to obtain a copy of the show or program, or learn more about same in order to watch the program at a later time. An individual may also wish to know, without having to resort to a printed TV Guide, which may not be at hand, or having to switch channels to an online TV Guide, when the TV program, show or movie started and when it will finish or how much of it has been missed, in order to be able to decide whether or not to watch this TV program, show or movie. An individual may also wish to know a brief synopsis of the transpired events in order to be able to understand the story line and enjoy the rest of the movie.

It is again noted that, while information regarding any of the respective television programs, movies or shows can be introduced prior to, or announced subsequent to, the broadcast of the respective program, movie or show, the information is typically not provided during the course of the broadcast and, as a result, an individual who misses the respective introduction or announcement may never receive the desired information.

In today's information age, individuals are use to, and have come to expect, if not demand, to have information available to them instantaneously. Yet, in spite of this, no system or apparatus is currently available which can provide radio broadcasts or television broadcasts along with information regarding the content of the respective broadcast.

SUMMARY OF THE INVENTION

The present invention pertains to an apparatus and method for providing information in conjunction with media content, which overcomes the shortfalls of the prior art. The present invention pertains to an apparatus and method for providing information in conjunction with media content and, in particular, to an apparatus and method for providing information in conjunction with broadcast media content, entertainment media content, and/or media content which can be stored on, and/or played from, a storage and/or playing medium.

The present invention provides an apparatus and method for providing information regarding the content of a radio broadcast, television broadcast, webcast, media broadcast of any kind or type, and/or information regarding media content which can be stored on a conventional storage medium. The present invention can also be utilized in order to provide information regarding, relating to, and/or descriptive of, radio programs, music, songs, television programs, television shows, movies, webcast, and/or audio or video information, of any kind.

The present invention can be utilized in order to provide information relating to, or regarding, live or pre-recorded broadcasts or transmissions of radio programs, songs, television programs, television shows, movies, webcast, and/or audio or video information of any kind. The present invention can also be utilized in order to provide information relating to, or regarding, radio programs, music, songs, television programs, television shows, movies, webcast, and/or audio or video information, which can be stored on any type or kind of storage medium.

The information which can be provided by the present invention can include any one or more of the name or title of the media content, the respective author(s), performer(s), musician(s), singer(s), actor(s), director(s), producer(s), writer(s), composer(s), involved in, and/or featured in, the respective media content, a description of the media content, the year produced, and/or any cost or price information regarding same. The information can also include the beginning and end time as well as the duration of the broadcast, such duration expressed in absolute units of time and/or as a percentage of the total length of the broadcast. The information can also include a brief synopsis of the transpired events and/or the story line. The information can also include a unique identification number which can be assigned to and/or which can be associated with each particular selection of media content.

The information, which can be provided by the present invention, can also include information regarding goods or services which information can be provided to a user along with, and/or in addition to, the other herein-described information regarding the media content. The information regarding goods or services can include marketing information, sales information, promotional information, advertisement information, and/or any other information for facilitating a sale of a respective good or service and/or for promoting a respective good or service.

The present invention can provide information regarding media content, such as, for example, a piece of music, a song, a television show, a movie, a radio program, etc., by displaying the information to a respective listener or viewer.

The apparatus of the present invention can include a broadcasting system, which can broadcast any of the various types or kinds of media content described herein. Any number of broadcasting systems can be utilized in conjunction with the apparatus of the present invention.

The apparatus of the present invention can also include a media-playing device which can receive broadcasts from any of the broadcasting systems utilized in conjunction with the present invention. The media-playing device can be any one of more of a radio, a television, a VCR, a tape player, a CD player, a DVD player a computer, a cellular telephone, an Internet appliance, a personal digital assistant, a wireless media-playing device or any other device, for receiving and/or for playing broadcasts, webcasts, or transmissions of media content. Any number of media-playing devices can be utilized in conjunction with the apparatus of the present invention.

The apparatus of the present invention can operate and/or can be utilized on, over, and/or in conjunction with, any suitable communication network or system which can include any one or more of a radio frequency (RF) communication network or system, a satellite network or system, a telecommunications network or system, a television communication network or system, a cable television communication network or system, a satellite television network or system, a closed-circuit communication network or system, the Internet, an intranet, an extranet, a wide-area network (WAN), a local area network (LAN), the World Wide Web, a wireless communication network, a cellular telecommunication network, a wireless Internet communication network, a wireless World Wide Web communication network and/or any other communications network capable of transmitting media content.

The apparatus of the present invention can also operate and/or can be utilized on, over, and/or in conjunction with, any other suitable communication network or system.

The broadcasting system can include broadcasting equipment needed or desired for facilitating the functionality of the respective media broadcasting system. The broadcasting system can also include a central processing computer and or central processing unit (CPU) for controlling the operation of the broadcasting system, and a memory device for storing any of the information described herein as being provided with the respective media content as well as any other information for facilitating the operation of the apparatus as described herein. The memory device can also be utilized in order to store media content.

The media-playing device can include media-playing equipment, which can be utilized to receive and/or to play any of the media content described herein. The media-playing device can also include a central processing computer and or central processing unit (CPU) for controlling the operation of the media-playing device. The media-playing device can also include an input device, which can include a remote control device, for inputting information and/or commands into the media-playing device. The media-playing device can also include a display device for displaying any of the information described-herein as being provided by the present invention.

A remote control device associated with a media-playing device can also include a display device for displaying requested any of the information described-herein as being provided by the present invention.

The present invention can be utilized in order to provide information relating to media content, which media content can include any one or more of audio information, video information, and/or audio and video information. The information can be provided along with the media content, which is being broadcast to a media-playing device. The information can also be provided along with media content which is being played from a storage medium located at, or in, the respective media-playing device.

The apparatus of the present invention can be utilized in order to provide broadcasts of music, songs, television shows, television programs, movies, and/or any other audio information, video information, and/or audio and video information. Any of the information, which can be provided by the present invention, can be encoded into the respective media content. The information can also be provided as a header file to the media content. The information can also be encoded into, multiplexed with, mixed with, and/or transmitted in conjunction with, the media content.

The information can also be encoded with, multiplexed with, mixed with, and/or stored in conjunction with, media content which is stored on a storage medium such as a compact disc, a digital video disc or digital versatile disc (DVD), a tape, digital TV recorder, an MP3 storage device, programmable memory, a hard disk, and/or any other storage medium.

The broadcasting system can broadcast or transmit media content along with the herein-described information regarding the media content. The media-playing device can receive and process the media content as well as the information, which pertains to the media content.

The media-playing device can play the media content. The media-playing device can also process and display the information pertaining to the media content for viewing by a respective listener or viewer. The media-playing device can also store the information pertaining to the media content in an appropriate buffer or storage location.

The present invention can be utilized in order to provide a listener with any one or more of the name of a song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song, in conjunction with a broadcast or a transmission of the media content.

The present invention can also be utilized in order to provide a viewer with any one or more of the name of a show, the performer(s) in the show, the actor(s) appearing in the show, the producer(s) or director(s) of the show, the price of a video copy of the show, an identification number pertaining to the show, beginning and end time as well as the duration of the broadcast, a brief synopsis of the transpired events and/or of the story line, and/or any other pertinent and/or relevant information regarding the show, in conjunction with a broadcast or a transmission of the media content.

The present invention can also be utilized in order to display information regarding media content which is being played on a media-playing device from a storage medium such as a compact disc (CD), a digital video disc or digital versatileversatile disc (DVD), a video cassette, a laser disc, a tape, digital TV recorder, MP3 device, hard disk, programmable memory, memory card, media card, or other recording and/or storage medium.

The present invention can also be utilized in order to provide a listener with any one or more of the name of a song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song, in conjunction with media content which is played on, or from, a media-playing device.

The present invention can also be utilized in order to provide a viewer with any one or more of the name of a show, the performer(s) in the show, the actor(s) appearing in the show, the producer(s) or director(s) of the show, the price of a video copy of the show, beginning and end time as well as the duration of the broadcast, a brief synopsis of the transpired events and/or of the story line, an identification number pertaining to the show, and/or any other pertinent and/or relevant information regarding the show, in conjunction with media content which is played on, or from, a media-playing device.

Accordingly, it is an object of the present invention to provide an apparatus and method for providing information in conjunction with media content.

It is another object of the present invention to provide an apparatus and method for providing information in conjunction with broadcast media content.

It is still another object of the present invention to provide an apparatus and method for providing information in conjunction with media content, which is stored on a storage medium.

It is yet another object of the present invention to provide an apparatus and method for providing information in conjunction with a radio broadcast, a television broadcast, webcast and/or a media broadcast, of any kind or type.

It is another object of the present invention to provide an apparatus and method for providing information in conjunction with radio programs, songs, television programs, television shows, movies, and/or audio or video information, of any kind.

It is still another object of the present invention to provide an apparatus and method for providing information in conjunction with live broadcasts of media content and/or broadcasts of pre-recorded media content.

It is yet another object of the present invention to provide an apparatus and method for providing information which can include any one or more of a name or title of the media content, a respective performer(s), singer(s), actor(s), director(s), producer(s), writer(s), composer(s), conductor(s), involved in, and/or featured in, the respective media content, a description of the media content, the year produced, and/or any cost or price information regarding same.

It is yet another object of the present invention to provide an apparatus and method for providing information which can include any one or more of a show's or a movie's beginning and end time as well as the duration of the broadcast, a brief synopsis of the transpired events and/or of the story line.

It is another object of the present invention to provide an apparatus and method for providing information in conjunction with media content which can be utilized on, or over, any one or more of a radio frequency (RF) communication network or system, a television communication network or system, a cable television communication network or system, a satellite communication network or system, a telecommunications network or system, and/or a closed-circuit communication network or system.

It is still another object of the present invention to provide an apparatus and method for providing information in conjunction with media content which can be utilized on, or over, any one or more of the Internet, an intranet, an extranet, the World Wide Web, a wide area network (WAN), a local area network (LAN), a cellular communication network or system, a wireless communication network, a wireless Internet communication network, and/or a wireless World Wide Web communication network.

It is yet another object of the present invention to provide an apparatus and method for providing information in conjunction with media content which is being broadcast to a media-playing device.

It is another object of the present invention to provide an apparatus and method for providing information in conjunction with media content which is being played from a storage medium located at, or in, the respective media-playing device.

It is still another object of the present invention to provide an apparatus and method for providing information in conjunction with media content wherein the information is any one or more of, encoded into, multiplexed with, mixed with, and/or transmitted in conjunction with, the media content.

It is yet another object of the present invention to provide an apparatus and method for providing information in conjunction with media content wherein the information is provided as a header file to the media content.

It is another object of the present invention to provide an apparatus and method for providing information in conjunction with media content wherein the information is any one or more of, encoded into, multiplexed with, mixed with, and/or transmitted in conjunction with, the stored media content.

It is still another object of the present invention to provide an apparatus and method for providing information in conjunction with media content wherein the information is provided as a header file to the stored media content.

It is yet another object of the present invention to provide an apparatus and method for providing information in conjunction with media content which can broadcast or transmit the information along with the media content.

It is another object of the present invention to provide an apparatus and method for providing information in conjunction with media content, which can be received and processed at a media-playing device.

It is still another object of the present invention to provide an apparatus and method for providing information in conjunction with media content, which can display the information to a respective listener or viewer.

It is yet another object of the present invention to provide an apparatus and method for providing information in conjunction with media content, which can display the information to a respective listener or viewer at, or in conjunction with, a media-playing device.

It is yet another object of the present invention to provide an apparatus and method for providing information in conjunction with media content, which can display the information to a respective listener or viewer at, or in conjunction with a remote control and/or input device associated with a media-playing device.

It is another object of the present invention to provide an apparatus and method for providing information in conjunction with media content which can store the information at, or in conjunction with, a media-playing device.

It is still another object of the present invention to provide an apparatus and method for providing information in conjunction with media content which can be utilized in order to provide a listener with any one or more of the name of a song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song.

It is yet another object of the present invention to provide an apparatus and method for providing information in conjunction with media content which can be utilized in order to provide a viewer with any one or more of the name of a show and/or movie, the performer(s) in the show and/or movie, the actor(s) appearing in the show and/or movie, the producer(s) or director(s) of the show and/or movie, the beginning time of the show and/or movie, the end time of the show and/or movie, and/or duration of the show and/or movie, a brief synopsis of the transpired events of the show and/or movie and/or of the story line, the price of a video copy of the show, an identification number pertaining to the show, and/or any other pertinent and/or relevant information regarding the show.

It is another object of the present invention to provide an apparatus and method for providing information in conjunction with media content which can also provide information regarding goods and services along with, and/or in addition to, the information regarding the media content.

Other objects and advantages of the present invention will be apparent to those skilled in the art upon a review of the Description of the Preferred Embodiments taken in conjunction with the Drawings, which follow.

DESCRIPTION OF THE PREFERRED EMBODIMENTS

Figure 1:
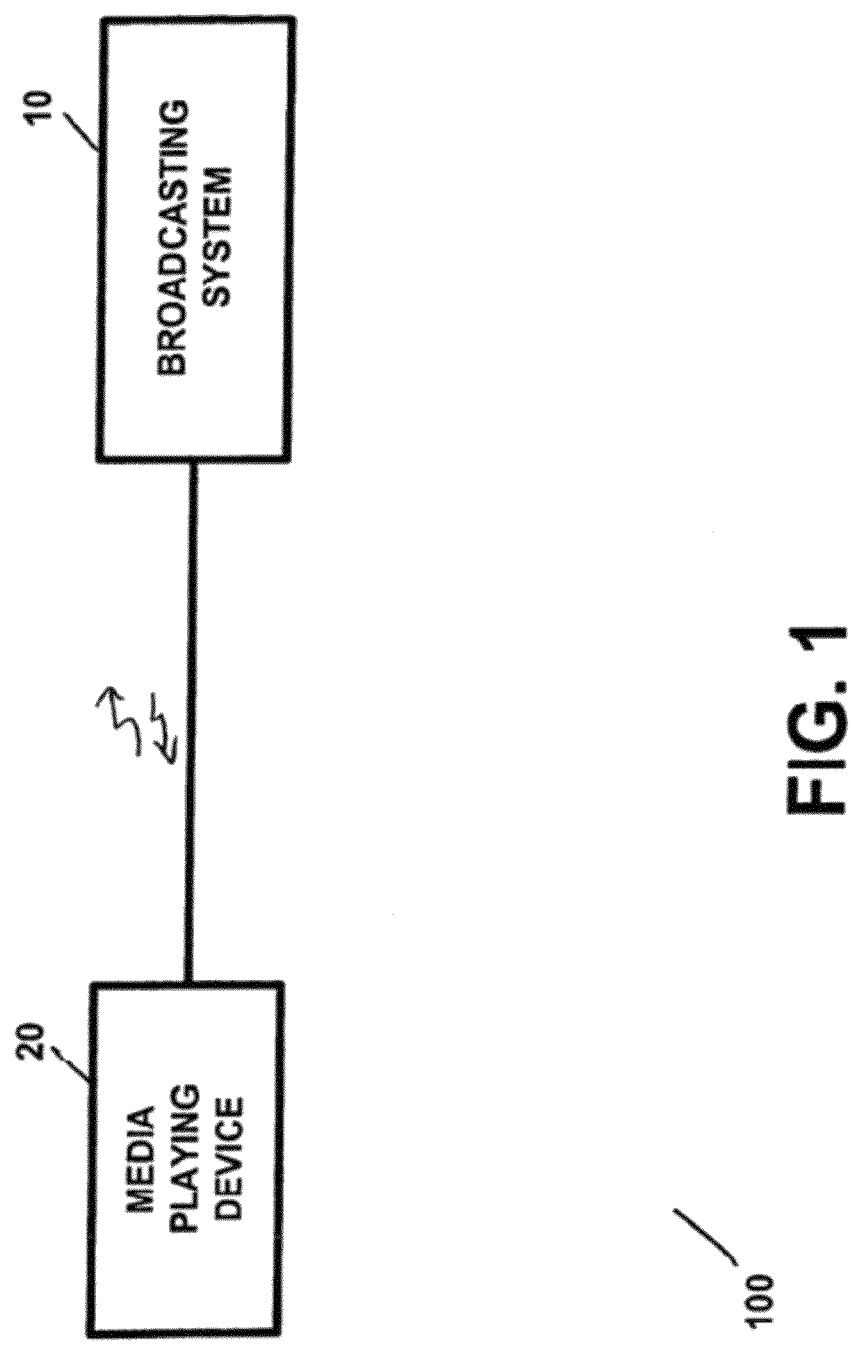
FIG. 1 illustrates a preferred embodiment of the apparatus of the present invention, in block diagram form.

The present invention pertains to an apparatus and method for providing information in conjunction with media content and, in particular, to an apparatus and method for providing information in conjunction with broadcast media content, entertainment media content, and/or media content which can be stored on, and played from, a storage and/or media medium.

The present invention provides an apparatus and method for providing information regarding the content of a radio broadcast, a television broadcast, a webcast, and/or a media broadcast of any kind or type, and/or information regarding media content which can be stored on a conventional storage medium. The information provided can include any information, descriptive matter, and/or other subject matter, regarding the media content.

In the preferred embodiments of the present invention, the apparatus and method can be utilized in order to provide information regarding, relating to, and/or descriptive of radio programs, songs, music, television programs, television shows, movies, radio and/or television advertisement of goods or services, and/or audio or video information of any kind. The respective radio programs, songs, music, television programs, television shows, movies, radio and/or television advertisement of goods or services, and/or audio or video information of any kind, can be broadcast from a broadcasting system or broadcasting station.

The respective radio programs, songs, music, television programs, television shows, movies, radio and/or television advertisement of goods or services, and/or audio or video information of any kind, can be broadcast as a live broadcast of media content or as a broadcast of pre-recorded or taped materials or media content.

In another preferred embodiment, the information can be provided along with, and/or in conjunction with, the respective stored radio programs, songs, music, television programs, television shows, movies, radio and/or television advertisement of goods or services, and/or audio or video information, on a storage medium which can include, but which is not limited to, a video cassette, VHS tape, Betacam tape, any kind of video tape, a film, a digital video disc or digital versatile disc (DVD), a compact disc (CD), a laser disc, a tape, a record, a computer hard disk, digital TV recorder, an MP3 player, PCMCIA memory card, flash media card, a digital memory device, any other electronic and/or magnetic storage media, and/or any other type of storage media.

The respective radio programs, songs, music, television programs, television shows, movies, radio and/or television advertisement of goods or services, and/or audio or video information, which can be stored on the respective storage medium can be broadcast from a respective radio broadcaster, television broadcaster, and/or other media broadcaster, and/or can be utilized on a user's media-playing device. The media-playing device can be, or can include, any one or more or a radio, a television, a personal computer, a portable computer, a compact disc (CD) player, a video disc (DVD) player, a laser disc player, a video cassette recorder (VCR), a video cassette player, a tape player, a tape recorder, a record player, an MP3 player, a personal digital assistant (PDA), an Internet appliance, cellular telephone, a wireless device, any analog media-playing device, any digital media-playing device, and/or any other suitable media-playing device.

The information which can be provided along with, and/or in conjunction with, the respective radio programs, songs, music, television programs, television shows, movies, radio and/or television advertisement of goods or services, and/or audio or video information, (hereinafter referred to as "media content") can include the name or title of the media content, the respective performer(s), singer(s), musicians, actor(s), director(s), producer(s), writer(s), composer(s), conductors, involved in, and/or featured in, the respective media content (i.e. a song performer, a music composer, a movie actor, a producer, etc.), a description of the media content (i.e. song lyrics description, description of advertised and/or featured goods and/or services, movie theme, brief synopsis of the transpired events and/or movie story line, etc.), the year produced, the year performed, the year recorded, and any cost or price information regarding same (i.e. song album price, movie video price, advertised and/or featured goods price, etc.). The information can also include a beginning time, an end time, a lapsed time expressed in absolute units and/or as a percentage of the total duration, duration of the media broadcast and/or playback. The information can also include a unique identification number which can be assigned to, and/or which can be associated with, each particular selection of media content.

The unique identification number can be utilized in order to identify a particular selection of media content, song, program, movie, etc., for any appropriate reason such as for broadcast planning, media content sales, etc. The information can also include any other data and/or information, which can be related to the media content.

The information, which can be provided by the present invention, can also include information regarding goods or services which information can be provided to a user along with, and/or in addition to, the other herein-described information regarding the media content. The information regarding goods or services can include marketing information, sales information, promotional information, advertisement information, and/or any other information for facilitating a sale of a respective good or service and/or for promoting a respective good or service.

As defined herein, the term "media-playing device", or the plural of same, refers to televisions, analog television sets, digital television sets, HDTV receivers, radios, radio receivers, analog radios, digital radios, stereos, tape players, record players, movie projectors, video projectors, compact disc (CD) players, digital video disc (DVD) players or digital versatile disc players, laser disc players, tape players, computers, MP3 players, Personal Digital Assistants (PDA), cellular phones, wireless devices, Internet appliances, multimedia devices, and/or any other suitable devices or systems which can be utilized in order to receive and present broadcasts of the media content described herein (i.e. radio broadcasts, television program broadcasts, webcast, etc.). The media-playing device can also be any other suitable device, which can play or present media content from a stored medium (i.e. video cassette recorders/players, etc.).

As defined herein, the terms "broadcaster", "media provider", or the plurals of same, refer to any broadcasters, radio broadcasters, television broadcasters, Internet webcasters, media broadcasters of any type, media content providers, and/or any providers or broadcasters of any of the media content described herein.

The apparatus and method of the present invention can provide information regarding media content, such as for example, a song, a music performance, a television show, a movie, a radio program, an advertisement of goods and/or services, etc., by displaying the information to an individual listener, viewer, or receiver of the respective media content. For example, information regarding a song, which is being broadcast by a radio station, can be provided on a suitable display device located on an individual's radio, stereo, computer screen, information display, and/or remote control device. The information can include any one or more of the name of the song, the album, if any, on which the song is featured, the artist or performer performing the song, the producer of the song, the composer of the song, the theme of the song or the song's lyrics, the year produced, and/or the price of a single recording and/or the price(s) of an album(s) featuring the song.

In the case of a television show, program, or movie, the information can include any one or more of the name of the show, program, or movie, the actor(s) featured in the show, program, or movie, the producer(s) or director(s) of the show, program, or movie, the writer(s) or composer(s) of the show, program, or movie, the theme of the show, program, or movie, the year produced, a brief synopsis of the story line and/or of the transpired events (from the start of the movie until the current moment and/or until the time when the viewer request such information), the start time, the end time, the duration expressed in the absolute time units or as a percentage of the total duration of the movie, program, or show, and/or the price of a recording or tape of the show, program, or movie.

In the case of any other media content, the information can include any of the above-described information and/or any other information, which may be relevant and/or pertinent to the media content.

FIG. 1 illustrates the apparatus of the present invention, which is designated generally by the reference numeral 100. With reference to FIG. 1, the apparatus 100 includes a broadcasting system 10 which can broadcast any of the media content described herein. Any number of broadcasting systems 10 can be utilized in conjunction with the apparatus 100 of the present invention. Each broadcasting system 10 can be associated with one or more of a radio broadcaster, a television broadcaster, a webcaster, a media broadcaster, a multimedia broadcaster, a radio station, a television station, an Internet server, or other media provider.

With reference once again to FIG. 1, the apparatus 100 also includes a media-playing device 20 which can receive broadcasts from any of the broadcasting systems 10 described herein. The broadcasts can include any of the herein-described media content. The media-playing device 20 can be associated with one or more individuals or users of the apparatus 100.

In the preferred embodiment, the media-playing-device 20 can be any one or more of a radio, a television, a computer, a network terminal, a personal digital assistant (PDA), an Internet appliance, a cellular telephone, a watch, or media receiver, for receiving broadcasts. In another preferred embodiment, the media-playing device 20 can be any one or more of a compact disc player (CD), a video disc player (DVD), a laser disc player, a video cassette recorder (VCR), a video cassette player, a personal video recorder, a tape player, an MP3 player, and/or any other suitable media-playing device for playing media content from a storage medium. Any number of media-playing devices 20 can be utilized in conjunction with the apparatus 100.

The apparatus 100 can operate and/or can be utilized on, over, and/or in conjunction with, any suitable communication network or system which can include any one or more of a radio frequency (RF) communication network or system, a cable radio communication network or system, a digital radio communication network or system, a satellite radio communication network or system, a television communication network or system, a cable television communication network or system, a digital television communication network or system, a high-definition television (HDTV) communication network or system, a satellite television communication network or system, a telecommunications network or system, a cellular telecommunications network or system, a radio telecommunications network or system, a wireless telecommunications network or system, an optical telecommunications network or system, a closed-circuit communication network or system, the Internet, an intranet, an extranet, the World Wide Web, a local area network (LAN) a wide area network (WAN), a wireless communication network, a wireless Internet communication network, and/or a wireless World Wide Web communication network. The apparatus 100 can also operate and/or can be utilized on, over, and/or in conjunction with, any other suitable communication network or system.

Figure 2:
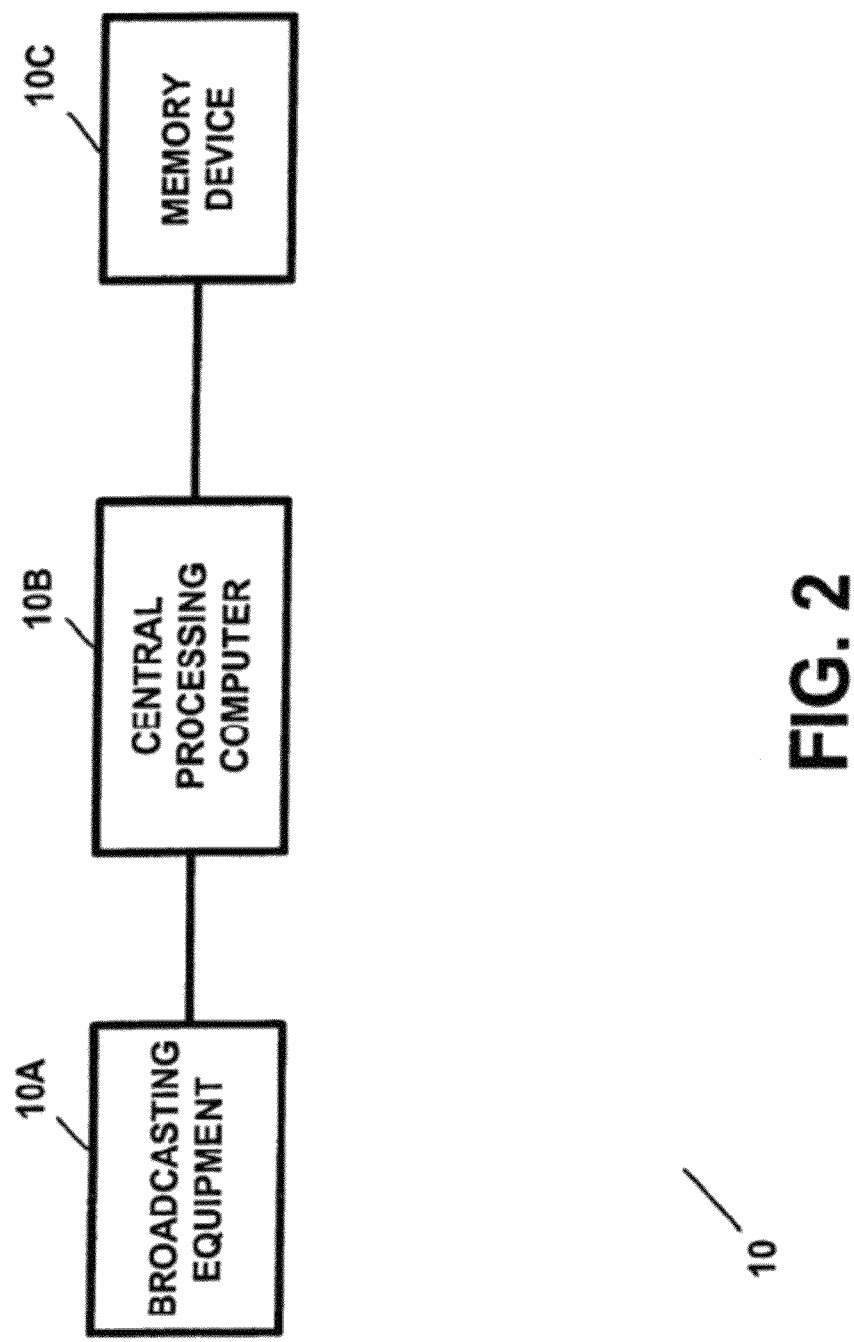
FIG. 2 illustrates the broadcasting system of FIG. 1, in block diagram form.

FIG. 2 illustrates the broadcasting system 10 of FIG. 1, in block diagram form. With reference to FIG. 2, the broadcasting system 10 includes broadcasting equipment 10A, which can include any and all of the components and/or system components commonly found in traditional broadcasting systems. In the case of a radio broadcasting system, the broadcasting equipment 10A can include any and/or all of the components commonly found in, and/or associated with, a conventional radio broadcasting system. Similarly, in the case of a television broadcasting system, the broadcasting equipment 10A can include any and/or all of the components commonly found in, and/or associated with, a conventional television broadcasting system. In the case of media broadcasting system of any kind or type, the broadcasting equipment 10A can include any and/or all of the components needed and/or desired for facilitating the functionality of the respective media broadcasting system.

With reference to FIG. 2, the broadcasting system 10 can also include a central processing computer and/or central processing unit (CPU) 10B and associated memory device 10C. The central processing computer and/or central processing unit (CPU) 10B can include a processor(s), a random access memory (RAM) device(s), read only memory (ROM) device(s), a magnetic memory storage (hard disk) device(s), an input device(s), a display device(s), an output device(s), and/or any other components or devices, including peripheral devices, for performing any of the functionality described herein. The central processing computer and/or central processing unit (CPU) 10B can be linked to, or connected to, the broadcasting equipment 10A. The memory device 10C can also be linked to, and/or connected to, the central processing computer and/or central processing unit (CPU) 10B.

The memory device 10C can contain any of the information described herein as being provided with the respective media content. For example, the memory device 10C can contain, for any given song, any one or more of the name of the song, the album, if any, on which the song is featured, the artist or performer performing the song, the producer of the song, the composer of the song, the theme of the song or the song's lyrics, the year produced, and/or the price of a single recording and/or the price(s) of an album(s) featuring the song.

In the case of a television show, program, or movie, the memory device 10C can contain any one or more of the name of the show, program, or movie, the actor(s) featured in the show, program, or movie, the producer(s) or director(s) of the show, program, or movie, the writer(s) or composer(s) of the show, program, or movie, the theme of the show, program, or movie, the synopsis of the story line and/or the transpired events, the year produced, start time, end time, lapsed time, and/or the price of a recording or copy of the show, program, or movie.

The memory device 10C can also contain media content, which is available for broadcast to any of the herein-described media-playing devices 20.

The media content can be provided with any of the herein-described information which can be provided in a header field, which can be encoded into the main body of the media content and/or which can be encoded in a carrier signal. In the case of a live broadcast from a stored medium, the information can be broadcast along with the media content from the media storage device. The central processing computer and/or central processing unit (CPU) can encode the pertinent information into the media content of a live broadcast and/or into the live broadcast of media content, which is being broadcast from a stored medium.

Figure 3:
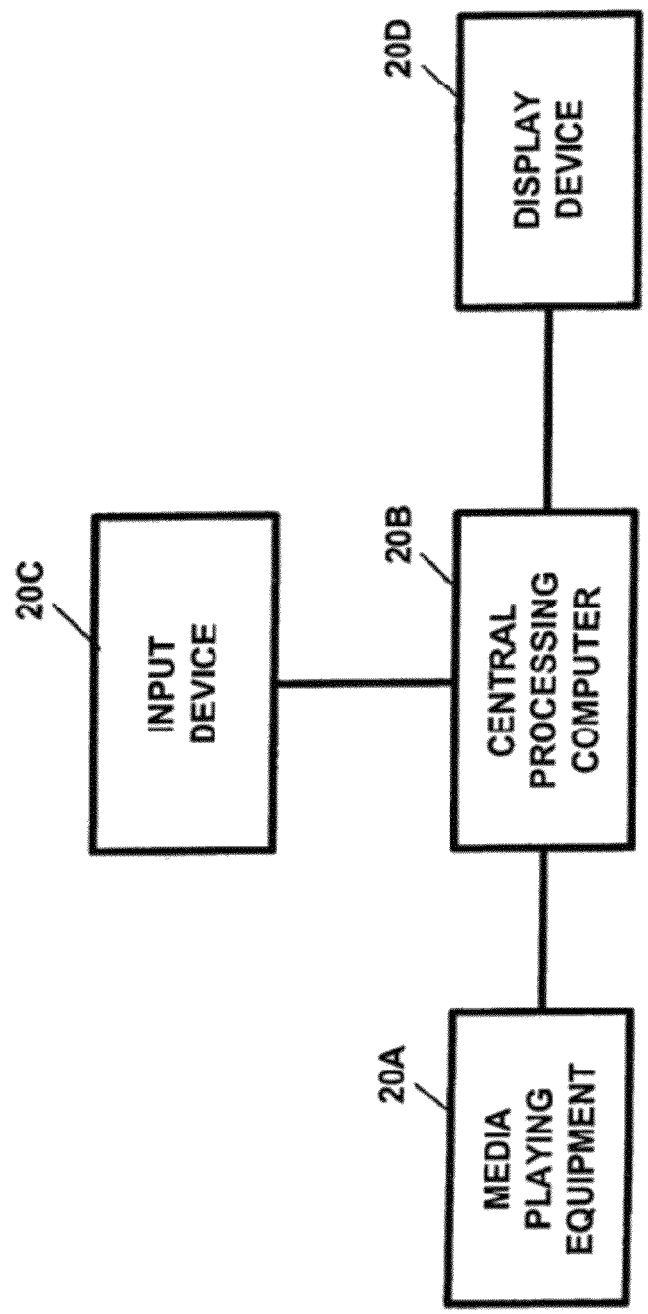
FIG. 3 illustrates the media-playing device of FIG. 1, in block diagram form.

FIG. 3 illustrates the media-playing device 20 of FIG. 1, in block diagram form. The media-playing device 20 can include media-playing device equipment 20A, which can include any and/or all of the components and systems of the respective media-playing device 20. The media-playing device equipment 20A can also include a reading device for reading information from a storage medium, such as, but not limited to, a compact disc (CD), a digital video disc or digital versatile disc (DVD), a laser disc, a tape, a video cassette tape, a personal video recorder, an MP3 storage device, and/or any other storage medium or device described herein.

The media-playing device 20 can also include a central processing computer 20B. The central processing computer 20B can include a processor(s), a random access memory (RAM) device(s), read only memory (ROM) device(s), a magnetic memory storage (hard disk) device(s), an input device(s), a display device(s), an output device(s), and/or any other components or devices, including peripheral devices, for performing any of the functionality described herein. The central processing computer 20B and/or central processing unit (CPU) can be utilized in order to process the information pertaining to the media content and/or to control the display of same. The central processing computer and/or central processing unit (CPU) 20B is linked with and/or connected to the media-playing equipment 20A.

With reference to FIG. 3, the media-playing device 20 can also include an input device 20C, which can include a remote control device, for inputting information and/or commands into the media-playing device 20. The remote control device can be utilized in order to provide remote control over the operation of the media-playing device 20 and/or the central processing computer and/or central processing unit (CPU) 20B. The media-playing device 20 can also include a display device 20D for displaying any of the information described-herein as being provided by the apparatus 100.

The display device 20D can be a separate display device dedicated to the display of the information provided by the apparatus 100 of the present invention. The display device 20D can also be integrated with the respective display screen or control panel of the respective media-playing device 20. The display device 20D can also be located on the remote control device 20B in addition to, and/or instead of, being located at, or on, the media-playing device 20. The display device 20D can also be located on the dashboard control display of a car radio and/or other vehicle media playing device 20.

As noted above, the apparatus 100 can be utilized in order to provide information relating to media content, such as, for example, audio information, video information, and/or audio and video information. In a preferred embodiment, the information can be provided along with media content, which is being broadcast to a media-playing device.

Figure 4:
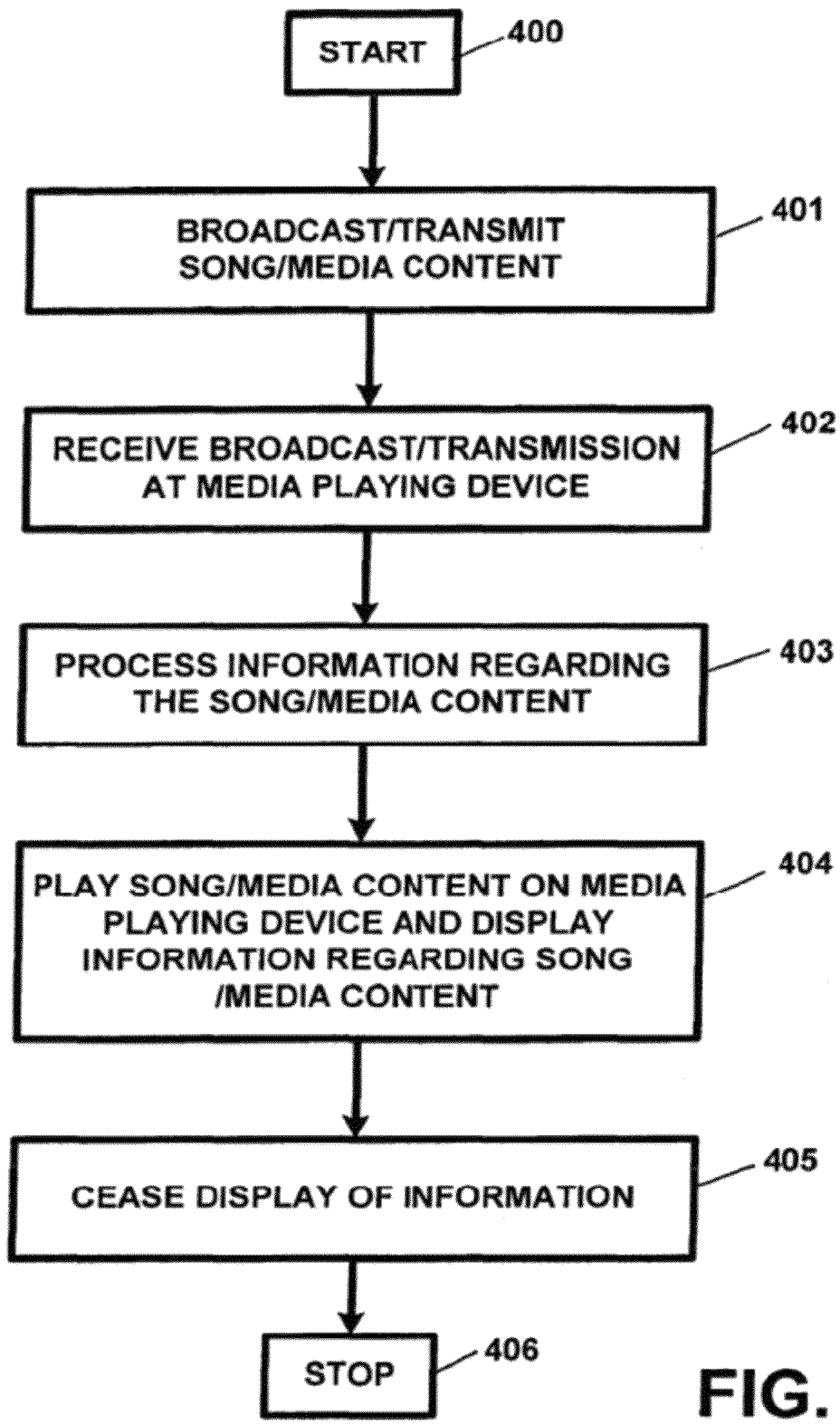
FIG. 4 illustrates a preferred embodiment method for utilizing the apparatus of the present invention, in flow diagram form.

FIG. 4 illustrates a preferred embodiment method for utilizing the apparatus 100, in flow diagram form. In the embodiment of FIG. 4, the apparatus 100 can be utilized in order to provide broadcasts of audio information, such as a radio broadcast or other transmitted broadcast of music, songs, advertisement of goods and/or services and/or other audio information, along with any of the herein-described information.

For example, the apparatus 100 can provide a radio broadcast of a song. In conjunction with the song, the apparatus 100 can provide any and/or all of the herein-described information pertaining to, and/or relating to, the song, such as, for example, information regarding the name of the song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song.

In the case of other audio information, such as, for example, news broadcasts, talk radio shows, and/or other audio content, which can be broadcast over the radio or other broadcast medium, the information can include any information pertinent to, and/or relevant to, the broadcast or show. This information can include news story name, title, description, place or time of occurrence, talk show subject matter, participants, etc.

In the case of other audio information, such as, for example, advertisement of goods and/or services, which can be broadcast over the radio or other broadcast medium, the information can include any information pertinent to, and/or relevant to, the advertisement of goods and/or services. This information can include brand name, size, color, material, suggested retail price, discount, purchase price, shipping and handling cost, delivery time, catalog number, etc.

Any of the herein described information can be transmitted along with the audio information, song, music, advertisement, or broadcast. The herein-described information can be encoded into a digital recording or digital file of the respective audio information, song, music, or broadcast media content.

The information can be encoded and stored at the beginning of the respective audio file, such as in a header portion of the audio information, and/or the information can be multiplexed with, and/or mixed with, the entire, or at least a portion of the, audio information. The information can be stored along with the audio information on a compact disc (CD), a digital video disc or digital versatile disc (DVD), a personal video recorder, a tape, an MP3 device, a computer, a personal digital assistant (PDA), an Internet appliance, a cellular phone, a watch, a digital memory device, a magnetic memory device, and/or any other storage medium.

In another preferred embodiment, the information can be broadcast along with the audio information by being co-broadcast in a portion of the signal bandwidth, by a suitable transmitter or transmission system. The information can also be encoded into, and/or with, the broadcast signal, and/or with a pulse(s) or train of pulses containing data representing the herein-described information.

In the preferred embodiment of FIG. 4, the operation of the apparatus 100 is described in conjunction with providing the herein-described information in conjunction with a radio broadcast of a song or selection of music. While, in the preferred embodiment, the apparatus 100 is described in conjunction with a radio broadcast of a song, the apparatus 100 of FIG. 4 can also be utilized in conjunction with Internet transmissions, broadcasts, and/or webcasts, MP3 transmissions or broadcasts, digital transmissions or broadcasts, analog transmissions or broadcasts, radio frequency transmission or broadcasts, satellite transmissions or broadcasts, cable transmissions or broadcasts, and/or any other suitable transmissions or broadcasts.

With reference to FIG. 4, the operation of the apparatus 100 commences at step 400. At step 401, the broadcasting system 10 broadcasts or transmits the song or selection of music, along with the herein-described information regarding the song or selection of music. At step 401, the broadcasting system 10 can broadcast or transmit the song or selection of music to any number of media-playing devices 20. In the embodiment of FIG. 4, the media-playing device 20 can be any one or more of a radio, a radio receiver, a radio tuner, a mobile radio (i.e. car radio, etc.), and/or any other device for receiving the radio broadcast or transmission.

At step 402, the media-playing device 20 associated with the individual can receive the broadcast. At step 403, the media-playing device 20 can process the information received in the broadcast. At step 403, the central processing computer and/or central processing unit (CPU) 20B can process the information pertaining to, and/or regarding, the media content, which can be transmitted as a header file to the song or selection of music, which can be transmitted throughout the broadcast of the song or music selection, and/or which can be transmitted during a portion of the song or music selection.

At step 404, the media-playing device 20 can begin playing the song or selection of music. At step 404, the information pertaining to, and/or relating to, the song or selection of music can be stored in a memory location or buffer and can be displayed on the display device 20D. In the case of information provided in a header file, the central processing computer 20B can latch or store the information in a buffer or memory device and, thereafter, display the information on the display device 20D. In the case of information which is multiplexed with, mixed with, or transmitted along with, the broadcast and/or with the media content, the central processing computer 20B can continuously process the information, such as at pre-determined time intervals, and latch or store the information in a buffer or memory device for display.

At step 404, the information is displayed on any one or more of the display device 20D, the radio display console, a dashboard display console of a car radio, and/or a display device located on the radio remote control device 20C. The displayed information can include any one or more of the name of the song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song.

The information can be displayed on the display device 20D which can be a dedicated display device, for displaying the above-described information, and/or which can be integrated into the radio control panel display and/or the radio remote control display. The information can also be audibly announced through the radio speaker(s) and/or earphones.

In this manner, the apparatus 100 can provide the individual who is listening to the song with any of the herein-described information relating to the song.

The displayed information can also include information regarding goods or services. The information regarding goods or services can include marketing information, sales information, promotional information, advertisement information, product information, service information, and/or any other information for facilitating a sale of a respective good or service and/or for promoting a respective good or service.

At step 404, the information pertaining to, and/or relating to, the song or selection of music, as well as any information regarding goods or services, can be displayed on the display device 20D for the duration of the song or selection of music or can be displayed for a portion of the song or selection of music. At step 405, the information will cease to be visually displayed and/or audibly announced upon the conclusion of the song or selection of music and/or at any other time during the playing of the song of selection of music. Thereafter, the operation of the apparatus 100 will cease at step 406, upon the conclusion of the song. The above-described process can then be repeated for a next song received from the broadcasting system 10.

Figure 5:
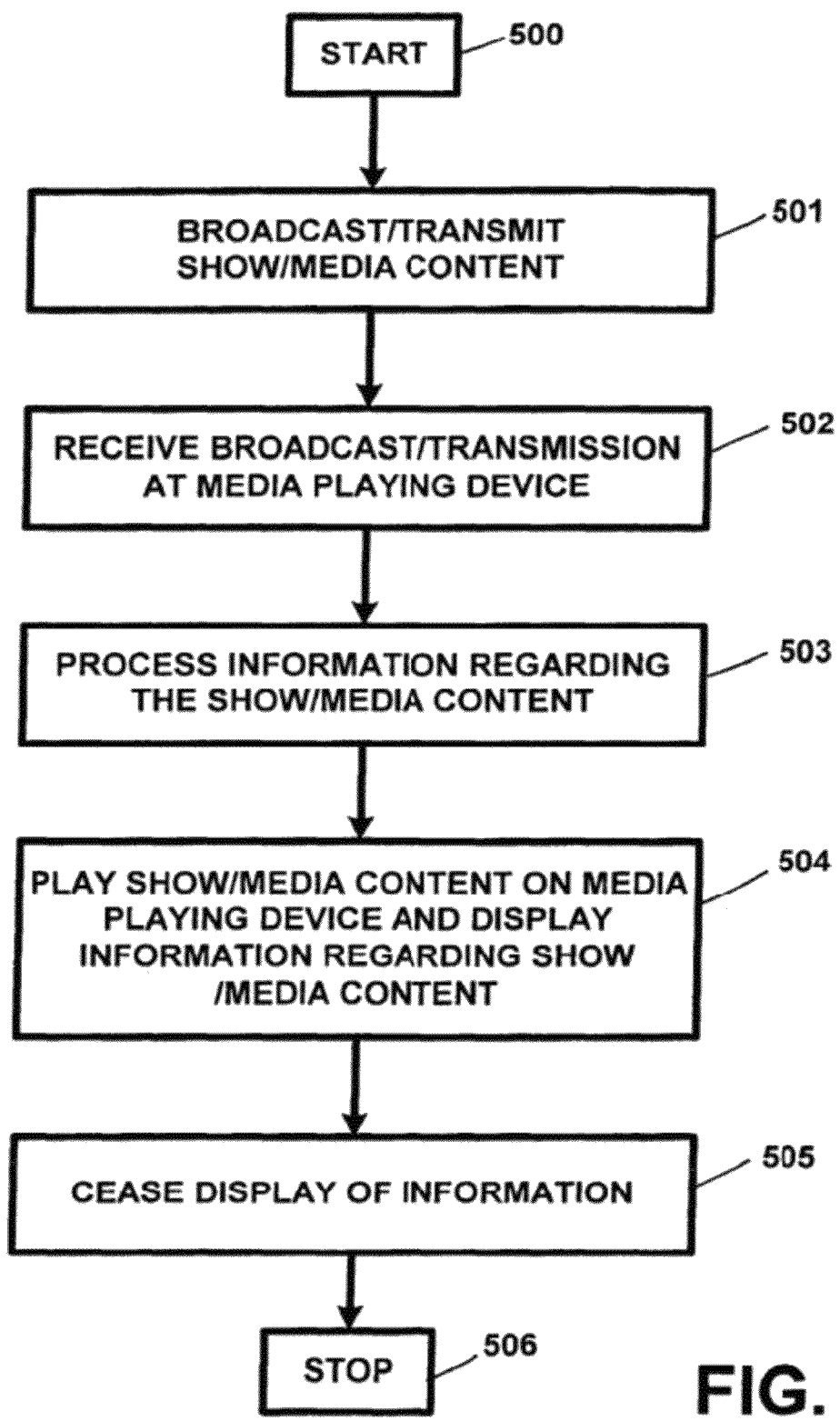
FIG. 5 illustrates another preferred embodiment method for utilizing the apparatus of the present invention, in flow diagram form.

FIG. 5 illustrates another preferred embodiment method for utilizing the apparatus 100, in flow diagram form. In the embodiment of FIG. 5 the apparatus 100 can be utilized in order to provide broadcasts of video information and/or audio and video information, such as from a television broadcast or other transmitted broadcast of television shows, television programs, movies, performances, music videos, etc., along with any of the herein-described information. For example, the apparatus 100 can provide a television broadcast of a television show, television program, performance, or movie (hereinafter referred to as "show").

In conjunction with the show, the apparatus 100 can provide any and/or all of the herein-described information pertaining to, and/or relating to, the show, such as, for example, information regarding the name of the show, the performer(s) in the show, the actor(s) appearing in the show, the producer(s) or director(s) of the show, the theme, subject, topic, and/or idea of the show, the rating of the show, the synopsis of the show story line and/or lapsed events, show start time, show end time, lapsed time of the show in absolute unit of time and/or as a percentage of the total show duration, the price of a video copy of the show, an identification number pertaining to the show, and/or any other pertinent and/or relevant information regarding the song.

In the case of other video information, such as, for example, a television program, television show, movie, music video, performance, news broadcast, talk radio show, and/or other video content, which can be broadcast over the television or other broadcast medium, the information can include any information pertinent to, and/or relevant to, the broadcast or show. This information can include show name, title, description, story line, actors or performers in the show, producers or directors of the show, place or time of occurrence, talk show subject matter, participants, etc.

Any of the herein described information can be transmitted along with the video information or media content of the show.

The information can be encoded and stored at the beginning of the respective video file, such as in a header portion of the video information, and/or the information can be multiplexed with, and/or mixed with, the entire, or at least a portion of the, video information. The information can be stored along with the video information on a compact disc (CD), a digital video disc or digital versatile disc (DVD), a laser disc, a video cassette tape, a personal video recorder, a removable hard disk, a flash media card, a streaming video file storage medium, and/or any other storage medium.

In another preferred embodiment, the information can be broadcast along with the video information by being co-broadcast, in a portion of the signal bandwidth, by a suitable transmitter or transmission system. The information can also be encoded into, and/or with, the broadcast signal, and/or can be transmitted as a series of pulses or pulse trains containing data representing the herein-described information.

In the embodiment of FIG. 5, the operation of the apparatus 100 is described in conjunction with providing the herein-described information in conjunction with a television broadcast of a show. While, in the preferred embodiment, the apparatus 100 is described in conjunction with a television broadcast of a show, the apparatus 100 of FIG. 5 can also be utilized in conjunction with Internet transmissions, webcasts or broadcasts, streaming video transmissions or broadcasts, digital transmissions or broadcasts, analog transmissions or broadcasts, radio frequency transmission or broadcasts, satellite transmission or broadcasts, cable transmission of broadcasts, wireless transmission or broadcasts, and/or via any other suitable transmissions or broadcasts.

With reference to FIG. 5, the operation of the apparatus 100 commences at step 500. At step 501, the broadcasting system 10 broadcasts or transmits the show, along with the herein-described information regarding the show. At step 501, the broadcasting system 10 can broadcast or transmit the show to any number of media-playing devices 20. In the embodiment of FIG. 5, the media-playing device 20 can be any one or more of a television, a television receiver, a mobile television (i.e. car television, etc.), a monitor, a display terminal, a wearable computer display, a personal digital assistant (PDA), a cellular telephone, a watch, a wireless device, and/or any other device for receiving the broadcast or transmission.

At step 502, the media-playing device 20 associated with the individual can receive the broadcast. At step 503, the media-playing device 20 can process the information received in the broadcast. At step 503, the central processing computer and/or central processing unit (CPU) 20B can process the information pertaining to, and/or regarding, the media content, which can be transmitted as a header file to the show, which can be transmitted throughout the broadcast of the show, and/or which can be transmitted during a portion of the show.

At step 504, the media-playing device 20 can begin playing the show. At step 504, the information pertaining to, and/or relating to, the show can be stored in a memory location or buffer and can be displayed on the display device 20D. In the case of information provided in a header file, the central processing computer and/or central processing unit (CPU) 20B can latch or store the information in a buffer, memory device, or storage device and, thereafter, display the information on the display device 20D. In the case of information, which is multiplexed with, mixed with, or transmitted along with, the broadcast and/or with the video information, the central processing computer 20B can continuously process the information, such as at pre-determined time intervals, and latch or store the information in a buffer or memory device for display.

At step 504, the information is displayed on any one or more of the display device 20D, the television screen, the television display or display console, and/or a display device of the television remote control device 20C.

The displayed information can include any one or more of the name of the show, the performer(s) in the show, the actor(s) appearing in the show, the producer(s) or director(s) of the show, the theme of the show, the rating of the show, the synopsis of the story-line of the show and of the transpired events, the start, end and/lapsed time of the show, the price of a video copy of the show, an identification number pertaining to the show, and/or any other pertinent and/or relevant information regarding the show. The information can be displayed on the display device 20D which can be a dedicated display device, for displaying the above-described information, and/or can be integrated into the television display screen, the television control panel display, and/or a display located on the television remote control device 20C. The information can also be audibly announced through the television and/or home theatre speakers and/or earphones.

In this manner, the apparatus 100 can provide the individual who is viewing the show with any of the herein-described information relating to the show.

The displayed information can also include information regarding goods or services. The information regarding goods or services can include marketing information, sales information, promotional information, advertisement information, product information, service information, and/or any other information for facilitating a sale of a respective good or service and/or for promoting a respective good or service.

At step 504, the information pertaining to, and/or relating to, the show, as well as any information regarding goods or services, can be displayed on the display device 20D for the duration of the show or can be displayed for a portion of the show. At step 505, the information will cease to be visually displayed and/or audibly announced upon the conclusion of the show and/or at any other time during the playing of the show. Thereafter, the operation of the apparatus 100 will cease, at step 506, upon the conclusion of the show. The above-described process can then be repeated for a next show received from the broadcasting system 10.

In another preferred embodiment, the apparatus 100 can be utilized to display information regarding audio information which is being played on a media-playing device 20 from a storage medium such as a compact disc (CD), a digital video disc or digital versatile disc (DVD), a record, a tape, an MP3 file storage device, a flash media card, digital memory, computer hard disk, or any other recording and/or storage medium. In this manner, an individual can obtain information pertaining to, or regarding, the media content or audio information from the storage medium. In this embodiment, the media content or audio information can include a song, a selection of music, or any other audio information, which can be stored on the storage medium. Information regarding the media content or audio information can be visually displayed and/or audibly announced by the media-playing device 20 as the media content device 20 plays the media content or audio information.

Figure 6:
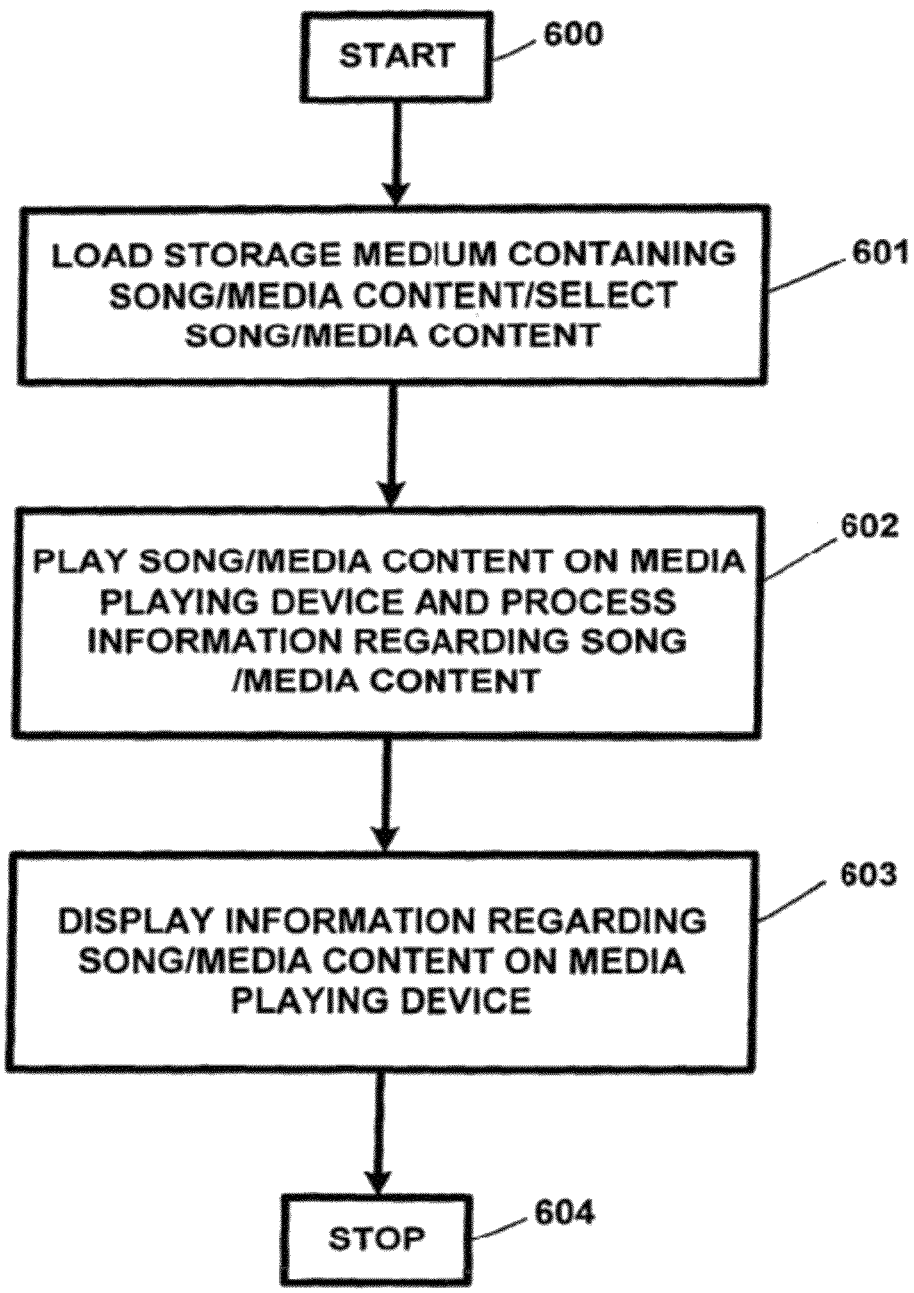
FIG. 6 illustrates still another preferred embodiment method for utilizing the apparatus of the present invention, inflow diagram form.

FIG. 6 illustrates another preferred embodiment method for utilizing the apparatus 100, in flow diagram form. In the embodiment of FIG. 6, the herein-described information can be encoded into a digital recording or digital file and stored in conjunction with the recording of the respective audio information, song, and/or selection of music. The information can be encoded and stored at the beginning of the respective audio file, such as in a header portion of the audio information, and/or the information can be multiplexed with, and/or mixed with, the entire, or at least a portion of the, audio information. In any event, the information can be stored in conjunction with, and/or along with the media content or audio information, the song, or the selection of music, on the respective storage medium.

The embodiment of FIG. 6 will be described herein in conjunction with providing information regarding a song or a selection of music, which is stored on a storage medium. The information pertaining to, and/or relating to, the song can include, for example, information regarding the name of the song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song.

With reference to FIG. 6, the operation of the apparatus 100 commences at step 600. At step 601, the individual can load the storage medium containing the song or selection of music, which storage medium can be any one or more of a compact disc (CD), a DVD, a record, a tape, an MP3 file storage medium, a laser disc, a, flash PC card (PCMCIA), a flash media card, a digital memory device, a floppy disk, a hard disk, or any other suitable storage device or medium, into the media-playing device 20 and/or into the reading device of the media-playing device 20. The media-playing device 20 can be any one or more of a compact disc (CD) player, a DVD player, a record player, a tape player, an MP3 player, a laser disc player, a computer, a personal digital assistant (PDA), a cellular phone, a watch, a wireless device, a multimedia device, or any other suitable device.

At step 601, the individual can also select the song or selection of music to be played on the media-playing device 20. At step 602, the media-playing device 20 can begin playing the song or selection of music. At step 602, the central processing computer and/or central processing unit (CPU) 20B can also process the information pertaining to, and/or regarding, the song or selection of music, which can be stored as header information, which can be encoded throughout the song, and/or which can be encoded for a portion of the song.

At step 602, the information pertaining to, and/or relating to, the song or selection of music can be stored in a memory location or buffer.

At step 603, the information is visually displayed on any one or more of the display device 20D, the radio display console, and/or a display device on the remote control device 20C and/or audibly announced through the speaker(s) normally associated with the media-playing device 20 and/or earphones connected thereto. In the case of information provided in a header, the central processing computer and or central processing unit (CPU) 20B can latch or store the information in a buffer or memory device. In the case of information which is multiplexed with, and/or mixed with, the recorded audio information, the central processing computer and or central processing unit (CPU) 20B can continuously process the information, such as at pre-determined time intervals, and latch or store the information in a buffer or memory device for visual display and/or audible announcement.

The displayed information can include any one or more of the name of the song, the performer(s) of the song, the composer(s) of the song, the producer(s) of the song, the album on which the song appears, the price of a song single, the price of an album(s) in which the song can be found, an identification number pertaining to the song, and/or any other pertinent and/or relevant information regarding the song. The information can be visually displayed on the display device 20D, which can be a dedicated display device, for displaying the above-described information, and/or can be integrated into the media-playing device 20 and/or the remote control device 20C of same. The information can also be audibly announced through the native speaker(s) of the device 20 and/or the earphones connected thereto.

In this manner, the apparatus 100 can provide the individual who is listening to the song or selection of music with any of the herein-described information relating to the song or selection of music.

The displayed information can also include information regarding goods or services. The information regarding goods or services can include marketing information, sales information, promotional information, advertisement information, product information, service information, good's retail price, good's manufacturer suggested price, purchase price of good or service, discount of good or service, cost of shipping and handling, material of a good, color of a good, size of a good, specifications of a good, details of service and/or any other information for facilitating a sale of a respective good or service and/or for promoting a respective good or service.

At step 603, the information pertaining to, and/or relating to, the song or selection of music, as well as any information regarding goods or services, can be visually displayed on the display device 20D for the duration of the song or selection of music or can be visually displayed or audibly announced for a portion of the song or selection of music. Thereafter, the operation of the apparatus 100 will cease, at step 604, upon the conclusion of the song. The above-described process can then be repeated for a next song, which is played on the media-playing device 20.

In another preferred embodiment, the apparatus 100 can be utilized to display information regarding video information, which is being played on a media-playing device 20 from a storage medium such as a compact disc (CD), a digital video disc or digital versatile disc (DVD), a laser disc, a record, a tape, a video cassette, a flash media card, a flash PC card, a floppy disk, a hard disk, an audio file, a video file, or any other recording and/or storage medium. In this manner, an individual can obtain information pertaining to, or regarding, the media content or video information from the storage medium. In this embodiment, the video information can include a movie, a show, a performance, or any other video information, which can be stored on the storage medium. In this manner, information regarding the respective video information can be visually displayed and/or audibly announced by the media-playing device 20 as the device plays the respective video information.

Figure 7:
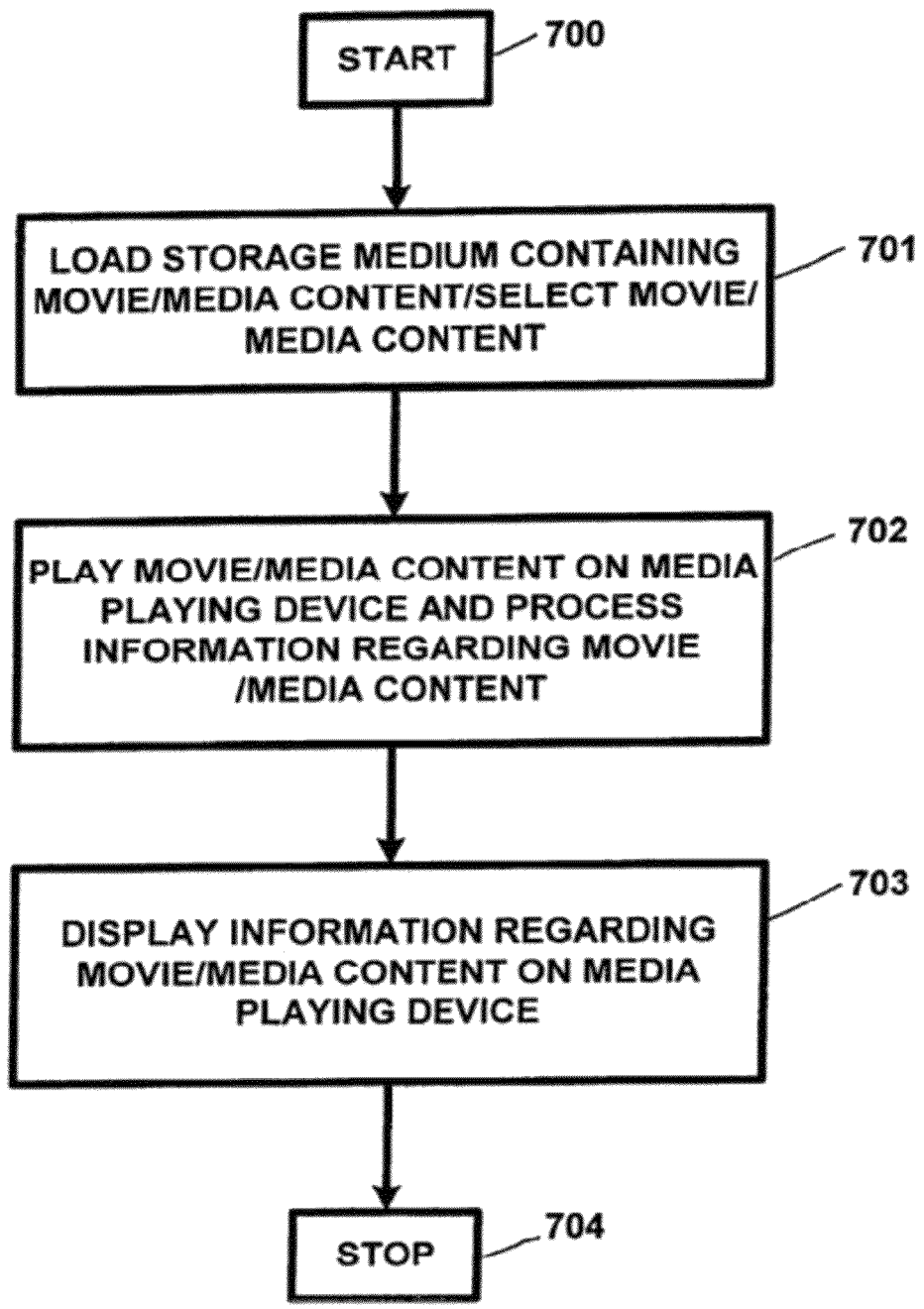
FIG. 7 illustrates yet another preferred embodiment method for utilizing the apparatus of the present invention, in flow diagram form.

FIG. 7 illustrates another preferred embodiment method for utilizing the apparatus 100, in flow diagram form. In the embodiment of FIG. 7, the herein-described information can be encoded into a digital recording or digital file and stored in conjunction with the recording of the respective video information, movie, show, performance, or any other video information. The information can be encoded and stored at the beginning of the respective video file, such as in a header portion of the video information, the information can be multiplexed with, and/or mixed with, the entire, or at least a portion of the, video information and/or encoded in the carrier signal or the portion thereof. In any event, the information can be stored in conjunction with, and/or along with the video information, movie, show, performance, or any other video information.

The embodiment of FIG. 7 will be described herein in conjunction with providing information regarding a movie, which is stored on a storage medium. The information pertaining to, or regarding, the movie can include the name of the movie, the performer(s) in the movie, the actor(s) appearing in the movie, the producer(s) or director(s) of the movie, the theme of the movie, the ratings of the movie, warnings of possibly objectionable content, parental guidance warnings, the synopsis of the movie's story-line and/or transpired events, the start time, the end time, the lapsed time expressed in absolute units of time and/or as a percentage of the movie duration, the price of a video copy of the movie, an identification number pertaining to the movie, and/or any other pertinent, and/or relevant, information regarding the movie.

With reference to FIG. 7, the operation of the apparatus 100 commences at step 700. At step 701, the individual can load the storage medium containing the movie, which storage medium can be any one or more of a video cassette tape, a compact disc (CD), a DVD, a laser disc, a flash PC card, a flash media card, a floppy disk a portable hard disk, a video file, or any other suitable storage device or medium, into the media-playing device 20 and/or into a reading device of the media-playing device 20. The media-playing device 20 can be a television and/or any one or more of a video cassette player, a video cassette recorder (VCR), a compact disc (CD) player, a DVD player, a laser disc player, a personal video recorder, a computer, a network terminal, an Internet appliance, a personal digital assistant (PDA), a cellular phone, a watch, a wireless device, a multimedia device, and/or any other device for playing video information.

At step 701, the individual can also select the movie, which is to be played, if more than-one are available on the storage medium. At step 702, the media-playing device 20 can begin playing the movie. At step 702, the central processing computer and or central processing unit (CPU) 20B can process the information pertaining to, and/or regarding, the movie, which can be stored as header information, which can be encoded throughout the movie, and/or which can be encoded for a portion of the movie and/or which can be encoded in the carrier signal or the portion thereof.

At step 702, the information pertaining to, and/or relating to, the movie can be stored in a memory location or buffer.

At step 703, the information is visually displayed on any one or more of the display device 20D, the television display screen or display console, and/or a display device on the television remote control device 20C, and/or audibly announced through the native speaker(s) normally associated with the device 20, external speakers, home theatre, and/or earphones connected thereto. In the case of information provided in a header, the central processing computer and or central processing unit (CPU) 20B can latch or store the information in a buffer or memory device. In the case of information which is multiplexed with, and/or mixed with, the recorded video information, the central processing computer and or central processing unit (CPU) 20B can continuously process the information, such as at pre-determined time intervals, and latch or store the information in a buffer or memory device for visual display and/or audible announcement.

The displayed information can include any one or more of the name of the movie, the performer(s) in the movie, the actor(s) appearing in the movie, the producer(s) or director(s) of the movie, the theme of the movie, the ratings of the movie, warnings of possibly objectionable content, parental guidance warnings, the synopsis of the movie's story-line and/or transpired events, the start time, the end time, the lapsed time expressed in absolute units of time and/or as a percentage of the movie duration, the price of a video copy of the movie, an identification number pertaining to the movie, and/or any other pertinent, and/or relevant, information regarding the movie.

In this manner, the apparatus 100 can provide the individual who is viewing the movie with any of the herein-described information relating to the movie.

The displayed information can also include information regarding goods or services. The information regarding goods or services can include marketing information, sales information, promotional information, advertisement information, product information, service information, good's retail price, good's manufacturer suggested price, purchase price of good or service, discount of good or service, cost of shipping and handling, material of a good, color of a good, size of a good, specifications of a good, details of service, and/or any other information for facilitating a sale of a respective good or service and/or for promoting a respective good or service.

At step 703, the information pertaining to, and/or relating to, the movie, as well as any information regarding goods or services, can be visually displayed on the display device 20D for the duration of the movie or can be visually displayed and/or audibly announced for a portion of the movie and/or at the viewer's requested. Thereafter, the operation of the apparatus 100 will cease, at step 704, upon the conclusion of the movie. The above-described process can then be repeated for a next movie, which is played on the media-playing device 20.

In view of the above, the present invention provides an apparatus and method, which can provide, visually display and/or audibly announce information regarding media content, which is being played at, or by, a media-playing device. In this manner, an individual listener or viewer can be provided with any of the herein-described information regarding, and/or relating to, the media content.

While the present invention has been described and illustrated in various preferred and alternate embodiments, such descriptions are merely illustrative of the present invention and are not to be construed to be limitations thereof. In this regard, the present invention encompasses all modifications, variations, and/or alternate embodiments, with the scope of the present invention being limited only by the claims, which follow.

The invention claimed is:

1. A method of providing content, the method comprising steps of:
   receiving media content at a content player;
   receiving at the content player information regarding the media content together with the media content, the information regarding the media content comprising at least one of a plot synopsis of the media content and a synopsis of transpired events in the media content;
   providing the media content received in the step of receiving to a user through the content player;
   announcing through an audio device of the content player at least a portion of the information regarding the media content received in the step of receiving, said at least portion of the media content comprising said at least one of the plot synopsis of the media content and the synopsis of transpired events in the media content.

2. The method according to claim 1, wherein the portion of the information regarding the media content further comprises a start time of the media content, an end time of the media content, and a lapsed time of the media content.

3. The method according to claim 1, wherein the step of receiving comprises receiving the media content from tape.

4. The method according to claim 1, wherein the step of receiving comprises receiving the media content from optical storage media.

5. The method according to claim 1, wherein the step of receiving comprises receiving the media content as compressed digital content; and
   the method further comprises processing the compressed digital content using a processor of the content player to obtain processed content; and the step of providing comprises playing the processed content.

6. The method according to claim 5, wherein the step of receiving comprises receiving wirelessly the media content and the information regarding the media content.

7. The method according to claim 5, wherein the step at receiving comprises receiving wirelessly a broadcast of the media content and of the information regarding the media content.

8. The method according to claim 5, wherein the step at receiving comprises receiving wirelessly a broadcast of the media content and of the information regarding the media content, the broadcast being selected from the group consisting of a radio broadcast and a television broadcast.

9. The method according to claim 5, wherein the step of receiving comprises receiving a satellite broadcast comprising the media content and the information regarding the media content.

10. The method according to claim 1, wherein the information regarding the media content comprises price of the media content.

11. The method according to claim 1, wherein the information regarding the media content is at least one of transmitted as a header file to the media content encoded into at least a portion of the media content, and transmitted during at least a portion of a transmission of the media content.

12. The method according to claim 1, further comprising:
    receiving commands for the content player through a remote control of the content player.

* * * * *

UNITED STATES PATENT AND TRADEMARK OFFICE
CERTIFICATE OF CORRECTION

PATENT NO. : 8,826,352 B2  Page 1 of 1
APPLICATION NO. : 13/470332
DATED : September 2, 2014
INVENTOR(S) : Alexander I. Poltorak It is certified that error appears in the above-identified patent and that said Letters Patent is hereby corrected as shown below:

In the Claims

Column 22, line 16, cancel "step at" and replace the cancelled text with --step of--;

Column 22, line 20, cancel "step at" and replace the cancelled text with --step of--;

Column 22, line 34, cancel "content encoded" and replace the cancelled text with --content, encoded--.

Signed and Sealed this
Thirteenth Day of January, 2015

Michelle K. Lee
*Deputy Director of the United States Patent and Trademark Office*